Figure 1:
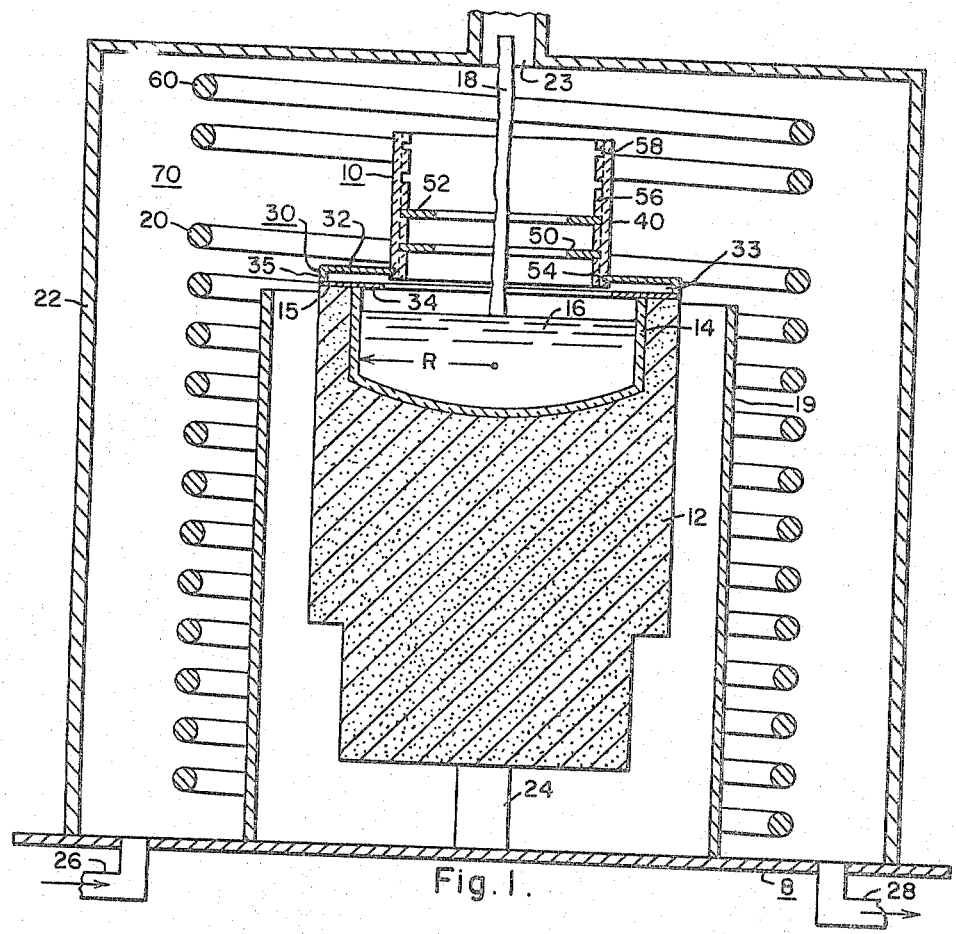

Sept. 19, 1967 S. N. DERMATIS 3,342,559
APPARATUS FOR PRODUCING DENDRITES
Filed April 27, 1964

INVENTOR
Steven N. Dermatis
BY
Frederick Slayer
ATTORNEY 3,342,559
APPARATUS FOR PRODUCING DENDRITES
Steven N. Dermatis, Waltham, Mass., assignor to Westinghouse Electric Corporation, East Pittsburgh, Pa., a corporation of Pennsylvania
Filed Apr. 27, 1964, Ser. No. 362,592
4 Claims. (Cl. 23—273)

This invention relates to an apparatus and method for improving the quality of dendritic semi-conductor material produced from supercooled melts.

More particularly, this invention relates to improving the quality of dendrites of higher melting point diamond crystal lattice materials such as silicon which dendrites have proven especially difficult to produce in the past.

Semiconductor materials in dendritic crystalline form offer many advantages rendering them highly useful for solid state device fabrication. One method for producing such dendritic crystalline members is by the continuous withdrawal thereof from a supercooled melt. This method is described in detail in U.S. Patent No. 3,031,403 of Allen I. Bennett, Jr. However, with some high melting point materials, particularly with silicon, many practical difficulties are often encountered in producing dendrites from supercooled melts, for example, there may occur spontaneous freezing or crystallization in the melt, or the dendrites may exhibit excess surface defects and have other physical defects such as lack of continuity in outline or in the twin planes.

In accordance with this invention it has been found that highly improved dendrites of materials such as silicon may be grown from supercooled melts by (1) establishing across the diameter of the melt a temperature profile such that the lowest supercooled temperature prevails reliably and controllably at the point from which the dendrite is being withdrawn, generally the center of the melt, (2) controlling the rate of latent heat escape and (3) controlling the thermal gradient along the dendrite withdrawn from the melt, all the above being accomplished by means as disclosed hereinafter.

Accordingly, it is an object of the invention to provide an apparatus for use in producing dendritic semiconductor material from supercooled melts, which (1) establishes a temperature profile across the melt favorable to supercooled dendritic crystal growth without spontaneous freezing in the melt and (2) controls the rate of latent heat escaping and the thermal gradient along the dendrite as it is withdrawn from the melt, whereby to substantially improve the quality of the dendrite produced.

Another object of the invention is to provide in an apparatus for growing silicon dendrites from supercooled melts, the combination comprising means for (1) reflecting radient energy into the peripheral area of the melt to maintain such peripheral area at a high temperature thus establishing a temperature profile across the melt favorable to supercooled dendritic growth without spontaneous freezing and (2) controlling both the rate of latent heat escape from the dendrite as it is grown and the thermal gradient along the dendrite as it is withdrawn from the melt, thereby improving the quality of the dendrite.

Another object of the invention is to provide an apparatus for producing improved dendrites of semiconductor materials from supercooled melts.

Another object of the invention is to provide a process for improving the quality of silicon dendrites by (1) establishing within the melt a temperature profile favorable to supercooled dendritic growth without spontaneous crystallization within the melt and (2) by controlling both the rate of latent heat escape from that portion of the melt to which it is imparted by the dendrite as it grows and the maintenance of a desired thermal gradient along the dendrite as it is withdrawn from the melt.

Other objects of the invention will, in part, be obvious and will, in part, appear hereinafter.

Figure 2:
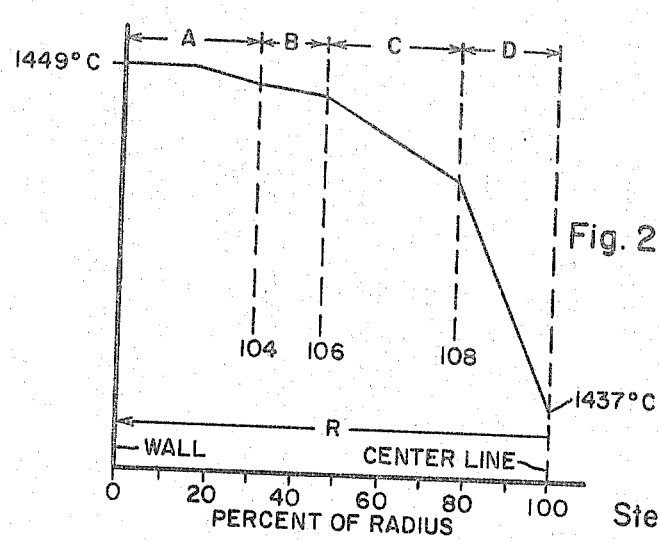

For a better understanding of the nature and objects of the invention, reference should be made to the following detailed description and drawings, in which:

FIGURE 1 is a schematic elevation, in cross section, of an apparatus embodying the invention; and FIG. 2 is a chart plotting temperature versus radial distance across a supercooled melt.

Ordinarily in growing dendritic crystals from supercooled melts by the general method set forth in Patent 3,031,403, a heated crucible, such as 12 in FIG. 1, is used to contain a supercooled melt 16 from which a dendritic crystal 18 is continuously withdrawn as it grows. While the method is generally highly successful, some materials such as silicon are particularly difficult to process into dendrites of highest quality for semiconductor device applications. With silicon, for example, the operation is hampered by spontaneous crystallization within the melt, particularly on the crucible walls, and premature melt freeze out. Also the dendrites often exhibit undesirable surface defects, generally attributable to an excessive temperature gradient along a short length of the crystal as it emerges from the melt, and sub-surface defects such as discontinuities in the twin planes, generally attributable to thermal conditions in the crystal growth region of the melt. A major consideration in this dendrite growth region is the presence of the latent heat liberated solidification of the melt into the dendrite the latent heat often causing irregular local temperature fluctuations which, though relatively small, result in erratic crystal growth.

Basically, the invention resides in elimination or substantial curtailment of these problems to enable production of satisfactory dendrites by the use of a crucible apparatus having suitable reflection and thermal insulating means at the upper portion thereof for (1) establishing across the supercooled portion of the melt a temperature profile such that the temperature is at a minimum in the center of the melt, namely at the point at which the dendrite grows and is being withdrawn, and the temperature increases radially outward towards the crucible walls where it is slightly below the normal melting point of the material, and (2) controlling both the escape of latent heat from the dendrite as it is formed and the maintenance of the desired thermal gradient along the dendrite as it is withdrawn from the melt. By the methods and means described in detail hereinafter such may be accomplished and results in a dendrite of highly improved quality may be consistently pulled.

More particularly the invention comprises a shield and cover means of "top hat" configuration, to be applied to a crucible containing a melt from which dendrites are to be drawn. As illustrated in FIG. 1 upon the top of a crucible 12 just above the surface of a melt 16 is a top hat portion 10. This top hat portion 10 comprises two reflector means and a thermally insulating member. A first reflector serves to direct and contain heat in the circumferential peripheral area of the melt 16. A second reflector and the insulating member serve also to retain heat in the area of the melt away from the center and further serve to control both the escape of released latent heat from the melt where the dendrite grows and the maintenance of a desired thermal gradient along the dendrite as it is withdrawn from the melt.

The top hat portion 10 comprises the first reflector 30 which resembles the brim portion of a top hat, and extending therefrom the insulating member comprising a right circular cylinder 40 of preferably a ceramic insulating material which will not contaminate the melt. The insulating right circular cylinder 40 is fixed to and extends upwardly from the inner edge of the reflecting brim portion 30. Positioned within the insulating cylinder 40 is a washer-like second reflector 50 which may be moved up or down therein. The brim portion 30 which comprises two members 32 and 34 spaced apart with a gap 33, will reflect heat into the circumferential peripheral area of the melt primarily into the outermost 25 to 35% of the radius of the melt. The reflectors 32 and 34 are preferably polished to insure good radiation of heat. The reflectors 32, 34 and 50 should have a high reflecting coefficient, for entrance 80% or greater. In order to achieve this the first reflector 30 is disposed to extend across the upper edge 15 of the crucible 12 and extend inwardly from the outside periphery of the crucible to a distance equal to from about 13 to 19% of the radius, R, of the crucible.

The cylinder 40 extends above the first reflector 30 to a height approximately equal to the radius of the melt R. The inside diameter of the cylinder 40 is approximately $\frac{2}{3}$ to $\frac{7}{8}$ the diameter of the melt (2R).

The second heat reflector 50 may be a washer-like member having an inner opening of a diameter equal to approximately R, disposed within grooves between a series of shelf-like projections 56 the cylinder 40, and serves to reflect heat (1) downwardly into the melt and (2) laterally against the dendrite as it is withdrawn from the melt the extent of each bieng controlled by its area or dimensions and upon the position of the second reflector 50 along the length of the cylinder. The second reflector member is preferably polished and is of a high reflectivity material (80% or higher) to insure good heat radiation. By locating the second reflector which has a cut-out corresponding to the projections 56 so that it can be moved up or down, on the lowermost shelf, namely in the position shown in FIG. 1, that is, close to the melt, most of the radiant energy reflected thereby will be projected into the melt and only a small initial portion of the dendrite 18 being pulled will be heated thereby. If, on the other hand, the second reflector 50 is moved upwardly for example into the topmost groove 58, more of its reflected radiation would be directed upon more of the dendrite and thereby a greater length of the dendrite will be heated, whereby a lower thermal gradient will be present. It should be understood that a low thermal gradient in the first few inches of the freely pulled dendrite results in less discontinuities and flows being present.

As an additional aid in controlling the thermal conditions within and at a point immediately above the upper top hat portion, supplemental heating means such as an induction coil 60, may be provided.

The invention is perhaps best described by reference to a specific apparatus embodying it. Referring again to FIG. 1 there is illustrated an apparatus 8 for growing dendrites of silicon. The apparatus 8 comprises a crucible 12 which stands about 3½ inches high, has an outside diameter of about 2¾ inches and a melt cavity having an inside diameter of slightly over 2 inches containing a melt 16 of silicon. The depth of the cavity in the crucible is about ⅞ of an inch, the cavity having a liner 14 of a high purity non-reactive material such as quartz in order to minimize contamination of the melt and to provide a minimum of nucleation sites. An opaque quartz shield 19 surrounds the crucible 12 to serve as a heat reflector. The crucible 12 is heated by a suitable means such as the induction coil 20 and the entire apparatus may be disposed within an outside heat shield 22 of quartz which is provided with an aperture 23 at the top to permit withdrawal of the dendrite. The coil 20 may be disposed outside of the shield 22 if desired. The crucible may be supported within the outside shield 22 by a support 24. The outside shield may be provided with an inlet 26 and an outlet 28 for introducing and withdrawing a protective gas and thereby controlling the atmosphere therewithin.

Disposed immediately above the crucible 12 and positioned upon its rim 15 is the top hat portion 10 comprising the first radiant reflector 30. The first reflector 30 comprises two reflecting members 32 and 34 with a small gap 33 disposed therebetween. The lower reflector member 34 is of flat washer-like configuration and has an outside diameter approximately equal to the outside diameter of the crucible, about 2¾ inches, and an inside diameter of about 1¾ inches and is about 10 mils thick. The member 34 is preferably of molybdenum or a base alloy thereof for example, an alloy containing at least 70% molybdenum balance tungsten, or nickel or a 70% nickel base alloy, or tantalum or a tantalum base alloy, such as 70% tantalum, 20% tungsten 10% hafnium alloy. The term "molybdenum base metal" and "tantalum base metal" as used herein refers to an all molybdenum or all tantalum member, or alloys of either in which the molybdenum or tantalum exceed 50%. The upper reflector member 32 is also of a flat washer-like configuration and has an outside diameter approximately equal to that of the lower member 34; its inside diameter may be approximately equal to that of the lower portion 34 or may be slightly smaller as indicated in FIG. 1 in order to facilitate attaching of the cylindrical portion 40 thereto. Thus, the upper member 32 may have an inside diameter of about 1½ inches. The upper member 32 is about 12 mils thick and preferably is of tantalum or a base alloy thereof, for example, an alloy containing at least 70% tantalum balance tungsten, or molybdenum or niobium. The upper member 32 may be provided with a downwardly extending flange 35 in order to provide the gap 33 which is approximately $\frac{1}{32}$ to $\frac{1}{16}$ inch.

The first reflector 30 may also include additional reflector portions above 32. However, the use of two reflectors, 32 and 34, has been found entirely satisfactory in growing silicon dendrites. That is, the particular combination comprising the first lower washer-like reflector of molybdenum or a base alloy thereof in combination with the similar upper washer reflector of tantalum or a base alloy thereof with a gap therebetween is highly effective in reflecting radiant energy especially into the outer peripheral 30% of the melt surface.

The insulating cylinder 40 is a right circular cylinder having an inside diameter of about 1⅜ inches (thus its radius is approximately ⅔ that of the melt radius) and a wall thickness of about ⅛ inch and is fabricated of an inert material having a lower thermal conductivity than metals. The cylinder 40 is of a glass-like or ceramic insulating material such as boron nitride or quartz in order to prevent contamination of the melt. An excellent material for this purpose was found to be a high purity fused quartz which has low heat conductivity, a high melting temperature and does not contaminate the melt. The effective height of the cylindrical insulator, that is, the extent to which it protrudes above the upper portion 32 of the first heat reflector 30 is about 1 inch, approximately the radius of the melt. The insulating cylinder 40 may be connected to the upper portion 32 of the first reflector 30 by various means, for example an interrupted tongue and groove arrangement 54, which minimizes any escape of heat.

Positioned within the cylinder 40 is the second reflector 50 which is a generally flat washer-like member with an inside opening of a radius of approximately half the radius of the melt. The outside diameter of the second reflector 50 fits into grooves between projections 56 in the cylinder 40. For example, the second reflector 50 may have an outside diameter of about 1½ inches thus fitting into circumferentially disposed grooves such as 58 on the inside diameter of the cylinder thus facilitating its positioning within the cylinder. As an alternative, the cylinder 40 may be split vertically to permit reflector 50 to be placed in a groove therein. As a further alternative, the reflector 50 may have two peripheral fins extending to a diametrical distance of 1½ inches from an outer washer of a 1⅜ inch diameter, which fins can fit into a continuous spiral groove in cylinder 40 and can be threaded in the groove to any desired position in the cylinder. In the particular embodiment described in this illustrative example, the second reflector 50 is about 12 mils thick or thicker and is of tantalum or a base alloy thereof, for example, an alloy containing at least 70% tantalum balance tungsten. One or more additional second reflector members such as 52 may be added as additional radiation controls. However, one reflector 50 is normally adequate for controlling silicon dendritic growth.

As previously indicated, the position of the reflector 50 may be varied along the length of the cylinder 40 by moving it upward or downward. A good position has been found to be a relatively short distance above the first reflector 30, for example, about ⅛ inch above the upper portion 32 of the first reflector.

In addition to the principal melt heating means, namely induction coils 20, there are disposed about the uppermost portion of the cylindrical insulator 40 additional heating means such as an induction coil 60. This secondary coil 60 is controlled independently of principal heating coil 20, and is intended to cooperate with the upper cylindrical portion 40 and the second reflector 50 to reduce the thermal gradient in the dendrite and thereby prevent thermal shock on the dendrite, as well as controlling the rate at which the latent heat of crystal fusion is dissipated out of the melt.

Thus, the three heat containing portions of the top hat portion 10 serve to (1) establish a heat profile across the surface of the melt favorable to supercooled dendritic growth, (2) control the thermal gradient along the dendrite as it is withdrawn from the melt and (3) control the flow of latent heat from the melt. These controls are aided by the addition of the supplemental heating means 60 in the area of the upper portion of the insulating cylinder.

For a better understanding of the temperature profile induced in the melts by the practice of the invention, reference should be made to FIG. 2 which is a graph plotting the temperature level versus radial distance from the outer crucible diameter toward the center of the melt. Four zones are indicated in FIG. 2 extending from zone A which is the outermost periphery of the melt, indicating the effect of shield A, to the innermost, or zone D encompassing the central portion of the melt. The temperature profile indicates the rapid and controlled drop in temperature from the periphery to the center of the melt which is maintained by the top hat portion. Accordingly, the heat controlling means as taught by the present invention effectively maintain a relatively high temperature moderately below the melting point, in the outer 70 to 80% of the melt diameter thereby effectively preventing any spontaneous nucleation in this area and along the crucible walls. Nucleation on the walls is further minimized by the use of a non-contaminating crucible liner for example, a quartz liner approximately 1/16 inch thick as illustrated in the FIG. 1 apparatus.

For a melt of silicon the profile temperatures in FIG. 2 are as follows: the highest temperature of 1449° C. prevails in the vicinity of the crucible walls. Proceeding inwardly to the boundary 104 of zone A, the zone of maximum influence of the first reflector, the temperature has dropped to a value of 1448° C. Proceeding further inwardly to line 106, the inner boundary of zone B, the area of maximum influence of the insulating cylinder, the temperature has dropped to a value of about 1447° C., and further proceeding to line 108, the inner boundary of the zone C, the area of maximum effect of the second reflector, the temperature has dropped to a value of 1443° C. Finally, in zone D, at the center of the silicon melt, the lowest temperature is observed to be about 1437° C. It is to be understood that these values are rough approximations and may be controllably varied from one apparatus to the next.

As indicated herein before the insulating cylinder 40 and the second reflector 50, in addition to their very substantial effect on melt temperature also exhibit a very substantial effect especially in cooperation with additional heating coil 60 in controlling the thermal gradient along the dendrite 18 as it is withdrawn from the melt. Experience has shown that an excessive thermal gradient, in the freshly pulled dendrite, for example, a 500° C. drop over a distance of about one-half centimeter above the melt, will probably cause surface and even sub-surface defects in the dendrite. By reducing this thermal gradient the thermal shock experienced by the dendrite is diminished markedly and much or all of this potential damage is eliminated. A temperature gradient of about 100° C. to 200° C. over a distance of about 0.5 cm. will probably alleviate most or all of the thermal shock induced defects in silicon dendrites. Such a desirable gradient is obtainable by the apparatus illustrated in FIG. 1 as described in detail above.

The control of the escape of latent heat from the growing dendrite is accomplished principally by the second reflector 50 and the secondary heating means 60 and has a two-fold effect: (1) the temperature at the center of the melt is controlled to a considerable extent by the escape of latent heat and (2) the thermal gradient along the dendrite is also determined by the latent heat. Thus, all of the effects of the various elements of the invention in controlling silicon dendritic growth conditions are substantially interrelated.

In practicing the invention, generally speaking, the method used in achieving dendritic growth from a supercooled melt is that generally used in practicing the art as described in U.S. Patent 3,031,403. That is, a crystalline silicon seed of suitable geometry having a plurality of twin planes, preferably three or more, and orientation is immersed into a supercooled silicon melt, for a period of time sufficient to achieve nucleation and dendritic crystal growth and then the seed is withdrawn at a rate commensurate with the crystal growth rate. The practice of the present invention establishes thermal conditions in the melt every favorable to uninterrupted dendritic crystalline growth of highest uniformity and quality. That is, the spontaneous freezing or crystallization often experienced in attempting to grow dendrites, particularly with such materials as a supercooled melt of silicon, is greatly alleviated in this respect by the establishment of the temperature profile such as that indicated in FIG. 2, within the melt. The particular parameters and other pertinent information for the growth of dendritic crystalline material is set forth in detail in Patent 3,031,403.

It is to be understood while the above description and drawings described relate to a particular specific embodiment of the invention many variations from such may be made without departing from the spirit of the invention. Further, while the invention has been described with particular reference to silicon dendrites such is not necessarily a limitation of the invention, since the same apparatus can be applied to germanium and III–V compounds.

The above description and drawings are to be considered illustrative of and not necessarily in limitation of the invention.

What is claimed is:

1. A top hat cover for an apparatus comprising a crucible from which semiconductor material in dendritic crystalline form is produced by the continuous withdrawal thereof from a substantially circular supercooled melt of the material, the cover comprising (1) a first brim-like reflecting means comprising at least two substantially flat metal washer-like members slightly spaced apart, the lower first extending from the outer periphery of the crucible radially inwardly so as to cover about the outer 13 to 19% of the melt diameter while the second upper washer member has a slightly smaller inside aperture cooperating to reflect heat downward into the melt primarily into the outer 25 to 35% of the melt diameter, the reflective members being of a metal being a reflectivity of at least 80%, (2) a hollow circular thermally insulating cylinder extending upwardly from the inside of the said second upper washer member, the insulating member having an inside diameter of approximately ⅔ the melt diameter and extending upwardly from the first reflecting means by an amount of about half the melt diameter, and (3) a second reflecting means comprising at least one substantially flat washer-like metal member of a reflectivity of at least 80% and having an aperture of a diameter equal to about the radius of the melt and being disposed within said insulating cylinder so as to lie in a plane substantially parallel to the surface of the melt and means for positioning the second reflecting means vertically along the length of the insulating cylinder such that (a) heat is reflected thereby into the outer portions of the melt and (b) cooperating with the said insulating cylinder to control the thermal gradient along the dendrite as it is withdrawn from the melt.

2. A top hat cover for an apparatus for producing semiconductor material in dendritic crystalline form by the continuous withdrawal thereof from a crucible containing supercooled melt of radius R of the material, the top hat cover applied to the top of the crucible comprising (1) a first reflecting means comprising two substantially flat, vertically spaced apart washer-like members the members being positioned in a plane substantially parallel to the surface of the melt with the upper member being of a tantalum base metal the lower member being of a molybdenum base metal, the said reflector members extending radially inwardly from the outer periphery of the crucible cavity by an amount of about 13 to 19% R thereby to reflect heat downwardly into the melt primarily in the peripheral 25 to 35% of the melt radius, (2) a hollow circular thermally insulating cylinder extending upwardly from the upper washer member of the first reflecting means, the said insulating cylinder being constructed of high purity fused quartz so as to minimize melt contamination therefrom, the said insulating cylinder having an inside radius approximately equal to about ⅔ R and extending upwardly above the upper member of the first heat reflecting means by an amount approximately equal to R and (3) a second heat reflecting means comprising at least one substantially flat washer-like member of tantalum base metal the inside diameter of said washer-like reflecting members being approximately equal to R, the reflecting members being connected to the inside wall of the insulating cylinder and disposed in a plane substantially parallel to the melt surface and means for positioning the second heat reflecting means along the length of the insulating cylinder whereby said second reflecting means (a) reflects heat into the outer areas of the melt and (b) cooperates with the insulating cylinder to control the thermal gradient along the dendrite as it is withdrawn from the melt.

3. In combination in an apparatus for producing semiconductor material in dendritic crystalline form by the continuous withdrawal thereof from a crucible containing supercooled melt of radius R of the material, comprising (A) a top hat cover applied to the top of the crucible comprising (1) a first reflecting means comprising two substantially flat, vertically spaced apart washer-like members the members being positioned in a plane substantially parallel to the surface of the melt with the first member immediately above the second and a gap interposed therebetween, the upper member being of a tantalum base metal and the lower member being of a molybdenum base metal, the members extending from the outer periphery of the crucible cavity radially inward beyond by an amount of about 13 to 19% R thereby to reflect heat downwardly into the melt particularly in the peripheral 25 to 35% R, (2) a hollow insulating circular cylinder extending upwardly from the upper reflecting member of the said first heat reflecting means, the said insulating cylinder being constructed of high purity fused quartz so as to minimize melt contamination therefrom, the said insulating cylinder having an inside radius approximately equal to about ⅔ R and extending upwardly above the said upper member of the first heat reflecting means by an amount approximately equal to R and (3) a second heat reflecting means comprising at least one substantially flat washer-like member of a tantalum base metal, the inside diameter of said washer-like reflecting member being approximately equal to R, the reflecting member being connected to and fitting against the inside diameter of the insulating cylinder and disposed in a plane substantially parallel to the melt surface and means for positioning the second heat reflecting means vertically along the length of the insulating cylinder whereby said second reflecting means (a) reflects heat into the outer areas of the melt and (b) cooperates with the insulating cylinder to control the thermal gradient along the dendrite as it is withdrawn from the melt and, (B) a heating means disposed about the upper portion of said insulating cylinder to heat said insulating cylinder and said second heat reflecting means to provide further control over the thermal gradient along the dendrite and the flow of the latent heat developed in the melt by dendritic growth.

4. In an apparatus for producing semiconductor material in dendritic crystalline form by the continuous withdrawal thereof from a supercooled melt, of radius R, of the material contained in the cavity of a crucible, a top hat cover for the crucible, comprising (1) a first brim-like reflecting means comprising two substantially flat, vertically spaced apart washer-like members positioned in a plane substantially parallel to the surface of the melt, the upper member being disposed immediately above the lower member with a small gap of a fraction of an inch therebetween, the upper member being of a tantalum base metal and the lower member being of a molybdenum base metal, the said reflector members extending from the outer periphery of the crucible cavity radially inwardly by an amount of about 13 to 19% R thereby to reflect heat downwardly into the melt primarily in the peripheral 25 to 35% R, (2) a hollow insulating circular cylinder extending upwardly from the upper reflecting member of the first heat reflecting means, the hollow insulating cylinder being constructed of quartz so as to minimize melt contamination therefrom, the hollow insulating cylinder having an inside radius equal to about ⅔ R and extending upwardly above the said upper member by an amount of about equal to R and (3) a second heat reflecting means comprising at least one substantially flat washer-like member of a tantalum base metal the inside diameter of said washer-like member being about equal to R, the reflecting member being fitting against the inside diameter of the insulating cylinder and disposed in a plane substantially parallel to the melt surface and means for positioning the second reflecting means along the length of the insulating cylinder such that adjustment in control is attained of the extent to which the said second reflecting means (a) reflects heat into the outer areas of the melt and (b) cooperates with the insulating cylinder to facilitate control on the thermal gradient along the dendrite as it is withdrawn from the melt.

References Cited

UNITED STATES PATENTS

| | | |
|---|---|---|
| 2,822,308 | 2/1958 | Hall. |
| 2,879,189 | 3/1959 | Shockley. |
| 2,890,139 | 6/1959 | Shockley. |
| 2,956,863 | 10/1960 | Goorissen _____ 23—273 X |
| 2,979,386 | 4/1961 | Shockley et al. ____ 23—301 X |
| 3,103,455 | 9/1963 | John et al. _____ 148—173 X |
| 3,162,507 | 12/1964 | Dermatis et al. ____ 23—301 X |
| 3,173,765 | 3/1965 | Gobat et al. _____ 23—273 X |

OTHER REFERENCES

Dendritic Growth of Germanium Crystals, Bennett et al. Physical Review, vol. 116, Oct. 1 1959, pages 53 to 61.

NORMAN YUDKOFF, Primary Examiner.

G. HINES, Assistant Examiner.